May 24, 1960 A. G. PETERSON 2,937,453
PITCH GAGE FOR BUTTRESS TYPE SCREW THREADS
Filed March 5, 1958 2 Sheets-Sheet 1
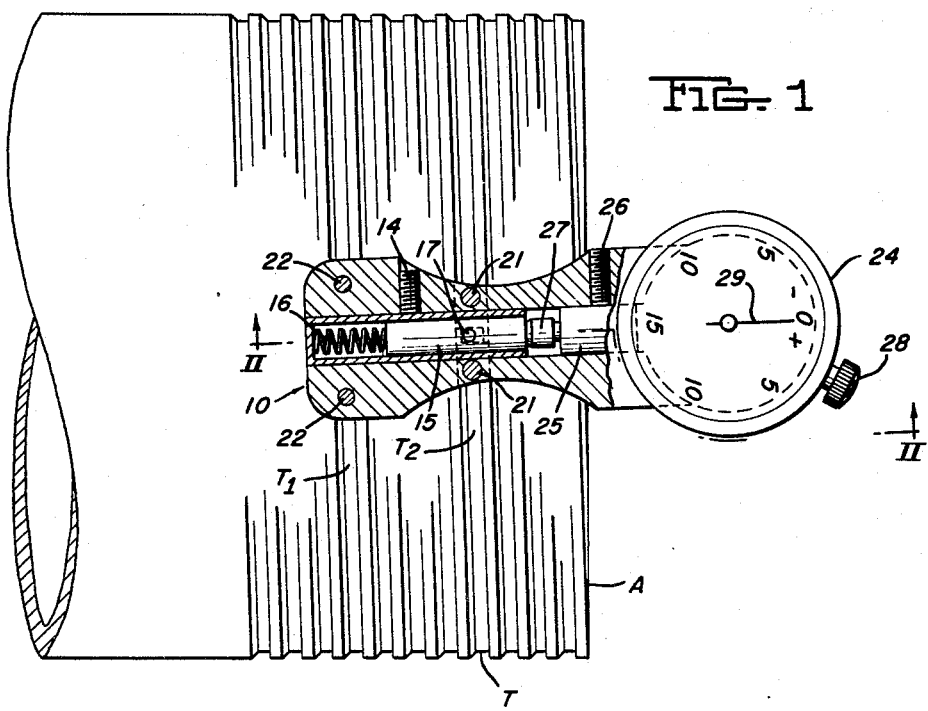
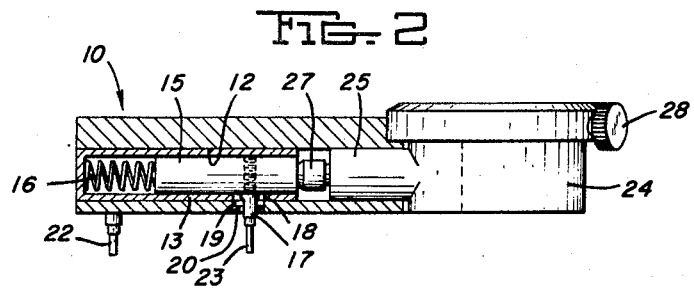
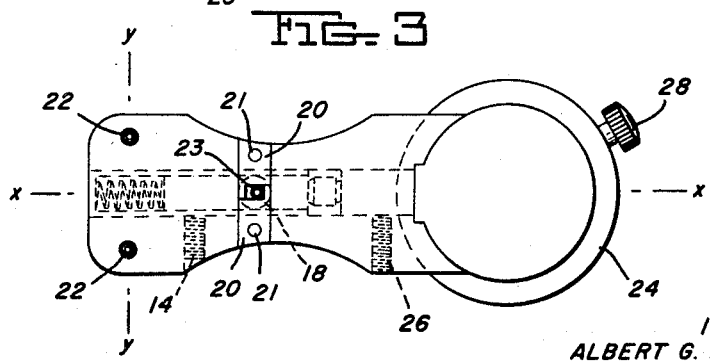
INVENTOR
ALBERT G. PETERSON
By Donald G. Dalton
Attorney May 24, 1960     A. G. PETERSON     2,937,453
PITCH GAGE FOR BUTTRESS TYPE SCREW THREADS
Filed March 5, 1958     2 Sheets-Sheet 2

INVENTOR
ALBERT G. PETERSON
By Donald G. Dalton
Attorney

United States Patent Office 2,937,453
Patented May 24, 1960

2,937,453

PITCH GAGE FOR BUTTRESS TYPE SCREW THREADS

Albert G. Peterson, 1613 Grant St., McKeesport, Pa.

Filed Mar. 5, 1958, Ser. No. 719,222

2 Claims. (Cl. 33—199)

This invention relates to an improved gage for checking the pitch of screw threads on relatively large diameter articles, such as pipes and couplings.

An object of the invention is to provide a gage which checks the pitch of screw threads with greater assurance of accuracy than gages previously available for this purpose and requires less skill to use.

A further object is to provide a gage which contacts one thread at spaced apart points along its helix and contacts a second thread at a single point, thereby positively positioning the gage with respect to the two threads, but without introducing any significant error resulting from the helix angle of the threads.

In accomplishing these and other objects of the invention, I have provided improved details of structure, preferred forms of which are shown in the accompanying drawings, in which:

Figure 1 is a top plan view, with parts broken away, of a gage constructed in accordance with my invention and positioned on a standard article, the gage being of a form especially adapted for measuring external threads;

Figure 2 is a longitudinal section on line II—II of Figure 1;

Figure 3 is a bottom plan view of the gage shown in Figure 1;

Figure 4:
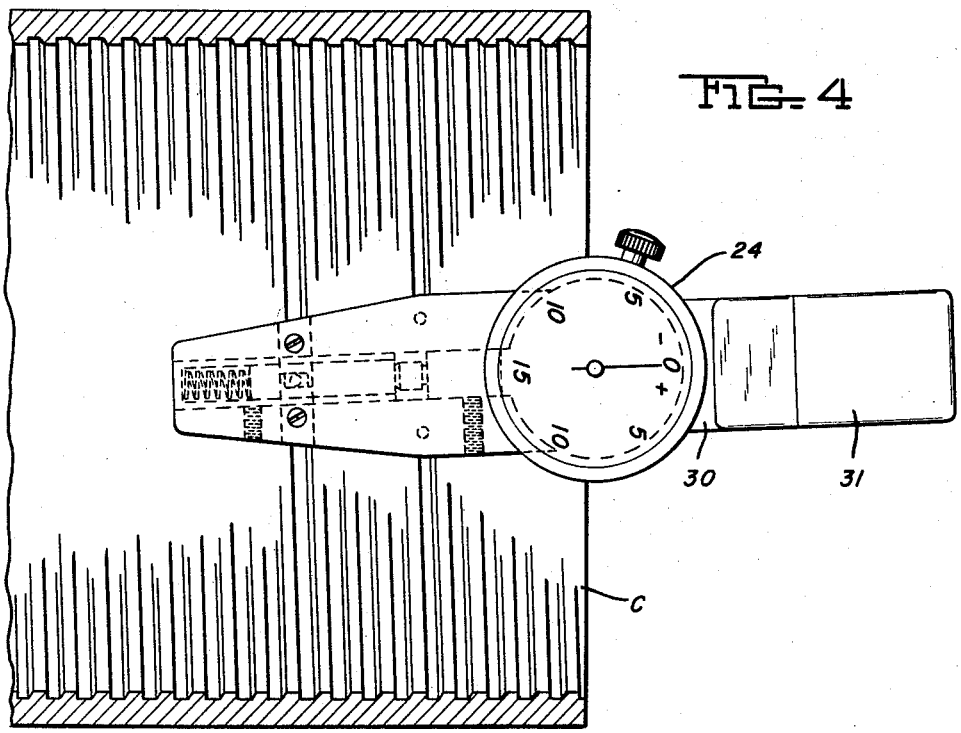
Figure 4 is a top plan view of a modified gage constructed in accordance with my invention and positioned on a coupling, the gage being of a form especially adapted for measuring internal threads.

The form of my gage shown in Figures 1, 2 and 3 includes an elongated body 10 which contains a longitudinal bore 12. A sleeve 13, closed at its exposed end, is fitted within the bore and held in a fixed position by a set screw 14. The sleeve contains a longitudinally reciprocable plunger 15 and a compression spring 16 which urges the plunger outwardly of the sleeve. A radially extending movable bearing pin 17 is fixed to the lower side of the plunger and projects through aligned openings 18 and 19 in the sleeve 13 and body 10 respectively. Preferably the underface of the body carries a pair of countersunk opposed L-shaped guide plates 20 (Figure 3) which are held in place by fillister screws 21 and limit movement of the bearing pin 17 and plunger 15. A pair of stationary bearing pins 22 also project from the underface of body 10. As Figure 3 shows, the movable pin 17 lies on the longitudinal center line $x$—$x$ of the body and always moves along this line. The stationary pins 22 lie on opposite sides of line $x$—$x$ preferably equidistant therefrom. A line $y$—$y$ connecting pins 22 is perpendicular to line $x$—$x$. The three bearing pins are required to contact the flanks of the respective threads at the pitch line. Therefore the movable pin 17 preferably has a removable tip 23 and the stationary pins are themselves removable to enable the proper tip and stationary pins to be installed for contacting any particular style of thread in the required relation.

A conventional plunger operated dial indicator 24 is mounted on the end of body 10. This indicator has a stem 25 which is received in bore 12 and held in place by a set screw 26. An operating plunger 27 projects from this stem and its end face abuts the end face of plunger 15. The indicator also has an adjusting knob 28 for setting the position of its hand 29. Inasmuch as dial indicators of this type are well known commercial items, no detailed description is deemed necessary. However, one example of a suitable indicator is the "Ames 107" described in a printed publication "Ames Micrometer Dial Gauges and Indicators," Catalog No. 58 of B. C. Ames Co., Waltham, Massachusetts.

Figure 5:
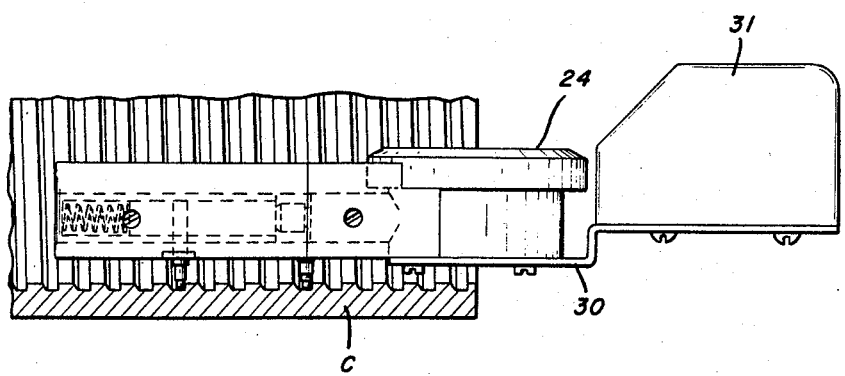
Figure 5 is a side elevational view of the modified gage shown in Figure 4.

Figures 4 and 5 show a modification adapted for measuring internal threads, as in a coupling C. In most respects the modified gage is similar to the form already described, but it includes a plate 30 fixed to the bottom of its indicator 24 and extending outwardly therefrom. Plate 30 carries a handle 31 which is accessible for manipulating the gage within the coupling. The relative positions of the fixed and movable pins are shown reversed from Figures 1, 2 and 3, but in either form this positioning is a matter of choice or convenience.

Before either form of gage is used to check pitch of threads on an article of any particular diameter, it is calibrated on a standard article A of the same diameter, whose threads T are known to be accurate, as illustrated in Figure 1. The stationary bearing pins 22 are inserted in a single thread $T_1$ of the standard article and the movable bearing pin in a second thread $T_2$ spaced from the first thread. Knob 28 of the dial indicator 24 is adjusted to position the hand 29 to a zero reading with the gage thus positioned on the standard article. The gage next is transferred to an article, such as a pipe, whose threads are to be checked and similarly positioned thereon. If the pitch is inaccurate, the indicator shows a corresponding plus or minus reading. If internal threads are to be checked, the standard article preferably is internally threaded.

When either form of my gage is positioned on an article, the three bearing pins positively position the gage with respect to the two threads and thus assure stability, but they introduce a slight theoretical error. The true pitch of threads is measured along a line parallel with the central axis of an article. Since my two stationary bearing pins are inserted within a single thread, line $y$—$y$ connecting them follows the helix of the thread, and center line $x$—$x$ of the gage is out of parallel with the central axis of the article by an angle equal to the helix angle. The smaller the diameter of the article, the greater the helix angle and the greater the error. The minimum article diameter with which I expect my gage to be used is about 4½ inches. A buttress thread of 5 threads per inch on such an article has a helix angle of about 0° 50′, which is about the maximum helix angle I expect to encounter. If the distance between line $y$—$y$ and the movable bearing pin 17 measured along line $x$—$x$ is 1 inch, the corresponding distance measured along a line parallel to the axis of the article is 1.00011 inches at the maximum helix angle. This distance is calculated by multiplying the measurement along line $x$—$x$ by the secant of the helix angle. The gage is intended to measure only to the closest thousandth of an inch; hence the error is less than the exactness of the gage.

It is seen that my gage overcomes a difficulty usually encountered in measuring pitch with conventional gages which contact both threads only at single points. Unless such are skillfully used, they are easily canted with respect to the central axis of the article and thus give a wholly erroneous reading. My gage, being positively positioned, always gives an accurate reading.

While I have shown and described certain preferred embodiments of my invention, it is apparent that modifications may arise. Therefore, I do not wish to be limited to the disclosure set forth but only by the scope of the appended claims.

I claim:

1. A gage for checking the pitch of screw threads of the buttress type comprising a body, a pair of spaced apart bearing pins fixed to said body and projecting from the underface thereof for contacting the flank of a thread at spaced apart points along its helix, a plunger movably mounted in said body, an additional bearing pin extending radially from said plunger and projecting from the underface of the body and being movable on a line perpendicular to a line connecting said fixed bearing pins, said additional bearing pin being adapted to contact the corresponding flank of a thread spaced from the first named thread, a spring acting between said body and said plunger urging said additional bearing pin away from said pair of bearing pins, said pair of bearing pins thus being adapted positively to position the gage with respect to the flank of the first named thread while said plunger and said spring hold said additional bearing pin in contact with the corresponding flank of the second named thread as the bearing pins follow the respective threads, and indicating means carried by said body and operatively connected with said plunger for indicating movement thereof and thus furnishing an indication as to whether the pitch of the thread is accurate, said indicating means being adjustable to show a zero reading when the gage is positioned on screw threads of known accuracy.

2. A gage as defined in claim 1 including guide plates fixed to the underside of said body, said additional bearing pin being confined between said guide plates which limit its movement.

References Cited in the file of this patent

UNITED STATES PATENTS

| | | |
|---|---|---|
| 1,281,805 | Metzger et al. | Oct. 15, 1918 |
| 1,879,398 | Mirfield | Sept. 27, 1932 |
| 2,004,225 | Steinle | June 11, 1935 |
| 2,233,626 | McClure | Mar. 4, 1941 |